Patented May 16, 1933

1,908,696

UNITED STATES PATENT OFFICE

BARNETT F. DODGE, OF NEW HAVEN, CONNECTICUT, ASSIGNOR TO S. KARPEN & BROS., OF CHICAGO, ILLINOIS, A CORPORATION OF WEST VIRGINIA

CATALYST FOR METHANOL MANUFACTURE AND METHOD OF PRODUCING SAME

No Drawing.   Application filed January 16, 1930.   Serial No. 421,263.

This invention relates to the production of synthetic methanol by the reaction of oxides of carbon with hydrogen at elevated temperatures and pressures, and to an improved catalytic agent which is particularly well suited to the purpose of aiding and expediting the reaction between hydrogen and oxides of carbon; also, to the method of producing such improved catalyst.

The primary object is to provide for the production of methanol at a more rapid rate than has hitherto been practicable.

A further object is the provision of an improved catalyst which may be usefully employed in the economical manufacture of methanol.

The use of contact bodies, serving as catalysts, is well known in the art of effecting reaction between carbon oxides and hydrogen to produce, for example, methanol; and many catalysts of this nature have been disclosed in patents and literature pertaining to the subject. Some of the known catalysts produce only moderately good results; and many of the disclosed catalysts possess, from a practical standpoint, very little value in the art.

The precise manner in which these catalysts act to aid in reaction between carbon oxides and hydrogen is not known. It has been found advantageous, however, to employ mixtures of materials of different compositions in a finely divided state; and experience has shown that the physical condition of the materials in the mixture is a most important factor, as is also the composition of the materials employed. On the other hand, the precise nature of the physical condition of any selected materials may be incapable of being clearly set forth. In such cases, resort to a description of the method of preparation is necessary.

The present invention is based on the discovery that it is possible to prepare mixtures of zinc oxide and copper in such a state or condition that a highly effective contact body is afforded; and that such contact body can be very advantageously employed to cause reaction between carbon oxides and hydrogen; and particularly in the production of methanol, or methyl alcohol.

Following is a description of the preferred method of producing a catalyst and employing it in the production of methanol:

Five parts by weight of zinc and one part by weight of copper (or their chemical equivalents) are converted into nitrates and dissolved in sufficient water to produce a solution whose concentration is approximately 15 grams of the total metal per liter. This solution is then treated at room temperature or higher with a saturated solution of sodium carbonate to effect the simultaneous precipitation of the zinc and copper carbonates, intimately commingled. The precipitate is washed to remove nitrates, filtered, pressed in a hydraulic press, dried and broken up into granules of any desired size. To produce the final catalyst, preferably these granules are treated with hydrogen, carbon monoxide, or mixtures of them, at atmospheric pressure and at temperatures ranging from 100° C. to 450° C. Preferably, this treatment is carried out by heating at 150° C. for a time, and ultimately raising the temperature to 300° C. The time of treatment may extend over a period of several hours, a period of 8 to 12 hours having been found very satisfactory.

The effect of the treatment probably is to decompose the carbonates, or reduce them to oxides, and reduce the copper oxide to metallic copper, which is thus present in the mixture in the form of very fine particles dispersed throughout the zinc oxide. The zinc oxide possesses as a result of the treatment, a physical structure which is well adapted to the purpose of the catalyst. The particles of copper, as a result of the treatment, possess a deep purple, or dark reddish purple color, which apparently is characteristic of a very active condition of the copper for catalysis purposes. Copper produced by the method described does not deteriorate if exposed to air. The improved catalyst is placed in a suitable reaction chamber and the gases to be united are passed through the catalyst at a suitable speed and pressure, while the retort or chamber is maintained at a suitable temperature. The ranges of speed, temperature and pressure known in the art are suitable, but it is preferred to employ high pressures rather than low pressures. On the other hand, the temperatures in the reaction chamber need be only moderately high.

A catalyst produced as described above is so active that it will produce methanol in appreciable quantities at temperatures as low as 200° C. with pressure of 2600 pounds per sq. in., using a gas mixture containing approximately two parts of hydrogen to one part of carbon monoxide by volume. At a temperature of 250° C., about 60% of the carbon monoxide is converted to methanol under the conditions just stated, using a space velocity of approximately 10,000. At a space velocity of approximately 100,000, this catalyst gives a space-time-yield (S. T. Y.) of about 2270 gals. of methanol per 24 hrs. per cu. ft. of catalyst space, employing a temperature of about 250° C. and 2600 pounds per sq. in. pressure.

Using other figures, when the improved catalyst is placed in a copper lined steel bomb and exposed to a gas composed substantially of two parts by volume of hydrogen and one of carbon oxide, at a pressure of 2600 pounds per sq. in. and a temperature of 300° C., with the gas flowing at a space velocity of 31,700 (volumes of gas measured at standard conditions entering per hour per volume of catalyst), the catalyst converted about 33.7% of the CO to methanol and gave a S. T. Y. of 1054 gallons per 24 hours, per cubic foot of catalyst space.

The composition can be varied within quite wide limits. It seems quite important, however, to employ a large excess of zinc. Preferably, the ratio of zinc to copper (atomic proportions) is at least four to one, but this may be reduced to two to one, or even lower, but with less satisfactory results.

The initial compounds of the improved catalyst are produced by precipitation of the compounds from solutions of the metals for two reasons. One is to insure purity; and another is to insure the desired form of the catalyst which follows from precipitation from a solution of the soluble salts followed by reducing treatment, which leaves the materials in the desired form. The joint precipitation, while important from the standpoint of easy production of an intimately commingled mixture perhaps is not an absolute essential. On the other hand, the feature of placing the materials used in the condition described above is highly important.

The precise method of precipitating from the solution the materials composing the catalyst is important. Thus, the best results are obtained by employing an alkali metal carbonate for precipitating the zinc and copper compounds.

However, a reasonably active catalyst may be obtained by precipitating from the nitrate solution of zinc and copper mentioned above zinc and copper compounds by means of a hydroxide of an elemental alkali metal, sodium or potassium. Thus sodium hydroxide may be employed for effecting the precipitation and the resulting compounds may be washed, dried and granulated and then subjected to reducing treatment in the manner stated above to obtain the catalyst; and this catalyst after reducing treatment may be employed in the synthesis of methanol in the manner stated above. Using a catalyst obtained in this manner, placed in a copper-lined steel bomb and exposed to a gas comprising two parts by volume of hydrogen and one of CO at a pressure of 2600 pounds per sq. in. at a temperature of 300° C with a gas flowing at a space velocity of 25,000, about 13 per cent of the CO is converted to methanol in one pass, and a space-time-yield of 313 gallons of methanol per twenty four hours per cubic foot of catalyst space is obtained.

It is also possible to use ammonium hydroxide to precipitate the metals from the solution of soluble salts, but a decidedly less active catalyst results. It appears, therefore, that given the metals which associated together are capable of producing a methanol catalyst, very much nevertheless depends upon the exact mode of treatment in producing the catalyst to obtain the best results.

While it is preferred to effect the precipitation from a solution of the mixed nitrates, it is possible to use other soluble salts in the solution. It is important, however, to avoid the presence of impurities or contaminating substances which may have a deleterious effect. Thus, it is desirable to avoid the presence of sulphur, the halides, etc. The improved catalysts described are halide-free. They are simply and cheaply produced and are highly resistant in the sense that they are well adapted to retain for a long period of time, the proper qualities to serve as a catalyst in the production of methanol, for example.

The foregoing detailed description has been given for clearness of understanding only, and no unnecessary limitations should be understood therefrom, but the appended claims should be construed as broadly as permissible, in view of the prior art.

It may be added that the activity of the catalyst may be increased by lessening the atomic per cent of zinc and correspondingly increasing that of copper. Thus 4 to 1, 3 to 1, 2 to 1 and 1 to 1 ratios give larger yields at lower operating temperatures than a 5 to 1 ratio. On the other hand, the higher the copper percentage the shorter the life or stability of the catalyst. Thus, the desirability of a high zinc atomic per cent is indicated, even at a cost of some loss in activity.

What I regard as new, and desire to secure by Letters Patent, is:

1. The method of producing a stable highly active copper zinc oxide catalyst which comprises reducing copper carbonate admixed with zinc carbonate in the proportion of at least two atoms of zinc and one of copper, in a heated reducing gas, whereby a stable highly active catalyst comprising zinc oxide and a stable purplish free copper is produced.

2. The method as set forth in claim 1 in which the zinc is taken in the proportion of at least four atoms to one of copper.

3. The method as set forth in claim 1 in which the carbonates are freshly prepared.

4. A stable highly active copper zinc oxide catalyst comprising zinc oxide and purplish free copper in the proportion of at least two atoms of zinc to one atom of copper.

5. A catalyst as set forth in claim 4 in which there are at least four atoms of zinc to each atom of copper.

6. A catalyst as set forth in claim 4 in which the catalyst is of the form resulting from the reduction of zinc and copper carbonates in a heated reducing gas.

BARNETT F. DODGE.